(12) United States Patent
Hoffman et al.

(10) Patent No.: US 7,141,964 B2
(45) Date of Patent: Nov. 28, 2006

(54) ADAPTIVE INTEGRATED CIRCUIT FOR MAGNETORESISTIVE SENSORS

(75) Inventors: Eric Hoffman, Middleton, WI (US); Nicholas F. Busch, Freeport, IL (US)

(73) Assignee: Honeywell International Inc., Morristown, NJ (US)

( * ) Notice: Subject to any disclaimer, the term of this patent is extended or adjusted under 35 U.S.C. 154(b) by 296 days.

(21) Appl. No.: 10/753,233

(22) Filed: Jan. 6, 2004

(65) Prior Publication Data

US 2005/0146322 A1    Jul. 7, 2005

(51) Int. Cl.
*G01B 7/00* (2006.01)
*H03K 3/59* (2006.01)

(52) U.S. Cl. .................. 324/207.12; 327/511
(58) Field of Classification Search ........... 324/207.12; 327/511
See application file for complete search history.

(56) References Cited

U.S. PATENT DOCUMENTS

| | | | |
|---|---|---|---|
| 4,847,584 A | 7/1989 | Pant | 338/32 R |
| 5,351,028 A | 9/1994 | Krahn | 338/32 R |
| 5,820,924 A | 10/1998 | Witcraft et al. | 427/130 |
| 6,297,628 B1 | 10/2001 | Bicking et al. | 324/207.21 |
| 6,525,531 B1 * | 2/2003 | Forrest et al. | 324/207.2 |
| 2003/0090265 A1 | 5/2003 | Wan et al. | 324/207.25 |
| 2003/0222637 A1 | 12/2003 | Stauth et al. | |

OTHER PUBLICATIONS

PCT-Notification of Transmittal of The International Search Report and The Written Opinion of the International Searching Authority, or the Declaration, Date of Mailing Jun. 27, 2005.
Honeywell Sensor Products, AH211, Jan. 2002, "Applications of Magnetic Position Sensors", Solid State Electronics Center, www.magneticsensors.com, pp. 1-8.

* cited by examiner

*Primary Examiner*—Edward Lefkowitz
*Assistant Examiner*—David M. Schindler
(74) *Attorney, Agent, or Firm*—Kermit D. Lopez; Matthew F. Lambrinos

(57) ABSTRACT

A device, system and method for adaptively tracking amplitude boundary values of a real time sensor output signal. In accordance with the method of the present invention, an amplitude boundary value, which may be a peak or min amplitude value, representing the current amplitude boundary of the sensor output signal is stored within a digital counter. A two-tap DAC is utilized to convert the digitally stored amplitude boundary value into a reference signal level corresponding in amplitude to the amplitude boundary value. The DAC also converts the amplitude boundary value into an offset reference signal level corresponding in amplitude to the amplitude boundary value offset by a specified multiple of the DAC resolution. The reference signal level and offset reference signal are compared with the real time sensor signal and the digitally stored amplitude boundary value is adjusted in accordance with which reference signal level exceeds the real time sensor signal.

17 Claims, 3 Drawing Sheets

ADAPTIVE INTEGRATED CIRCUIT FOR MAGNETORESISTIVE SENSORS

TECHNICAL FIELD

Embodiments are generally related to signal detection and processing. The Embodiments are also related to detecting maximum and minimum differential signals such as those generated within a magnetoresistive sensor system. Embodiments are additionally related to a detector device and method for adjustably tracking single ended amplitude peak and/or minimum values of a sensor signal.

BACKGROUND OF THE INVENTION

Magnetic sensing devices have many applications, including navigation, position sensing, current sensing, vehicle detection, and rotational displacement. There are many types of magnetic sensors, but essentially they all provide at least one output signal that represents the magnetic field sensed by the device. The Earth, magnets, and electrical currents can all generate magnetic fields. The sensor may be able to detect the presence, the strength, and/or the direction of the magnetic field.

The strength of the magnetic field may be represented by a magnitude and a polarity (i.e., positive or negative). The direction of the magnetic field may be described by its angular position with respect to the sensor. Magnetic sensors measure magnetic fields to determine position related parameters such as shaft rotation, presence of magnetic ink, vehicle heading, etc. One of the benefits of using magnetic sensors is that the output of the sensor is generated without the use of contacts. This is a benefit because over time contacts can degrade and cause system failures.

One type of magnetic sensor utilized in many conventional sensing applications is a magnetoresistive (MR) sensor. MR sensors are a type of magnetic sensor that uses the magnetoresistive effect to detect a magnetic field. Ferromagnetic metals, such as the nickel-iron alloy commonly known as Permalloy, alter their resistivity in the presence of a magnetic field. When a current is passed through a thin ferromagnetic film in the presence of a magnetic field, the voltage will change. This change in voltage represents the strength or direction of the magnetic field. By designing an MR sensor in a Wheatstone bridge configuration, for example, either the strength or direction of the magnetic field can be measured. The characteristic high-sensitivity and accuracy make MR sensors well suited for precision applications.

Magnetoresistive sensors are utilized in many automotive and aerospace applications. In automotive applications, for example, magnetoresistive sensors are often utilized for sensing cam and crank shaft targets. A magnetoresistive sensor system that may be utilized for sensing shaft rotation or linear displacement is depicted in FIG. 1. Specifically, FIG. 1 illustrates an anisotropic magnetoresistive (AMR) sensor system generally comprising an MR bridge 2, differential signal amplification and adjustment circuit 4 and an output signal detect module 6. MR bridge 2, comprising multiple AMR elements configured in a Wheatstone Bridge arrangement, delivers the differential signal, typically about 30 mV peak to peak, sensed across the bridge to amplification and adjustment circuit 4 where the sensed signal is amplified and centered at a specified reference voltage point using standard operational amplifier techniques.

The resultant signal, $V_{out}$, is processed by detector module 6 which employs signal conditioning circuitry to provide an accurate determination of the target position of the linear or rotational position and displacement. The primary function of the signal conditioning circuitry within detector module 6 is to capture the peak and min values of the amplified signal, and use these values to generate a threshold voltage signal that is the mid point of the captured peak/min values.

FIG. 1B is a waveform diagram illustrating exemplary signals employed by detector module 6 for conditioning the sensed output signal, $V_{out}$. As shown in FIG. 1B, sensor output signal 22 is a single ended signal and varies between peak and min amplitudes and represents the amplified AMR bridge signal. Detector module 6 translates sensor output signal 22 into a corresponding detected output signal 28 with the use of a threshold signal 25 by outputting a signal high when the value of sensor output 22 is above threshold 25 and outputting a signal low when the value of sensor output 22 is below threshold 25.

Threshold signal 25 is determined by averaging a max or peak signal 24 with a min signal 26. Peak signal 24 is determined in accordance with the sensed peaks and min signal 26 in accordance with the min values of sensor output 22. In this manner, threshold signal 25 is able to follow sensor output 22 which is very important in AMR sensing applications in which the MR sensor output is subject to drift due to operating and environmental factors such as temperature changes. It will be noted that during each cycle the peak signal 24 is "pushed down" and subsequently reacquires at the beginning of the next peak of sensor output 22, and conversely, min signal 26 is "pushed up" and reacquires at the beginning of the next min value of sensor output 22. This periodic re-adjustment is necessary to adaptively track the peaks and minimums of the sensor output.

A device that may be employed by detector module 6 for detecting and adjustably tracking the peak signal 24 is depicted in FIG. 1C. Specifically, FIG. 1C illustrates a signal tracking device generally including a comparator 18 which compares the amplified sensor output, $V_{out}$, with the presently stored peak value. A digital storage device in the form of a counter 14 is utilized to store the peak value with the output from comparator 18 used for incrementing the presently stored counter value when the signal from AMR sensor 12 exceeds the value of the presently stored peak value. Counter 14 is periodically updated by the output from comparator 18. The stored reference value is applied in the depicted example as a 9-bit output to a 9-bit digital-to-analog converter (DAC) 16 which converts the digitally stored value to the corresponding output peak boundary value which is applied to the input of comparator 18 for comparison with the real time sensor output on the next counter clock cycle. Although not depicted, it will be readily understood that a min detector can be similarly constructed by the use of a decrementing counter and switching the respective comparator inputs.

The mixed signal peak detector device depicted in FIG. 1C addresses analog leakage problems since the peak reference value is digitally stored in the period between sensor output peaks. However, the design of this peak detector is problematic in terms of its practicable application as a high-resolution, high slew rate tracking and low power device. Since the output from DAC 16 varies discretely in conformance with digital increments, the peak reference signal follows discrete steps determined in accordance with the DAC design. In the depicted example of a 9-bit DAC 16 and assuming a DAC range of 2V, the minimum resolution of the peak signal is 3.9 mV. For a 7-bit DAC having the same range, the resolution is 15.6 mV.

A resolution having fine granularity is generally desired to track the peak with maximum real time accuracy but is limited by the clock speed in terms of its ability to track a high slew signal. For example, if the clock speed is 10 MHz and a 9-bit DAC having 3.9 mV steps is used, the fastest slew rate that can be tracked is 39,000V/second while a 7-bit DAC can track at 156,000V/second. This tracking speed versus resolution tradeoff cannot be addressed by increasing the clock speed since, in practical application, a fast settling DAC requires a lower RC time constant and is incompatible with the low power requirements (typically less that 5 mA) of the application specific integrated circuits on which the detector circuits reside.

From the foregoing, it can be appreciated that a need exists for a low power sensor output amplitude threshold tracking device that provides a high-resolution capability with high slew rate tracking. The present invention addresses such a need.

BRIEF SUMMARY OF THE INVENTION

The following summary of the invention is provided to facilitate an understanding of some of the innovative features unique to the present invention and is not intended to be a full description. A full appreciation of the various aspects of the invention can be gained by taking the entire specification, claims, drawings, and abstract as a whole.

A device, system and method for adaptively tracking amplitude boundary values of a real time sensor output signal are disclosed herein. In accordance with the method of the present invention, an amplitude boundary value, which may be a peak or min amplitude value, representing the current amplitude boundary of the sensor output signal is stored within a digital counter. A two-tap DAC is utilized to convert the digitally stored amplitude boundary value into a reference signal level corresponding in amplitude to the amplitude boundary value. The DAC also converts the amplitude boundary value into an offset reference signal level corresponding in amplitude to the amplitude boundary value offset by a specified multiple of the DAC resolution. The reference signal level and offset reference signal are compared with the real time sensor signal and the digitally stored amplitude boundary value is adjusted in accordance with which reference signal level exceeds the real time sensor signal.

All objects, features, and advantages of the present invention will become apparent in the following detailed written description.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION OF THE INVENTION

The particular values and configurations discussed in these non-limiting examples can be varied and are cited merely to illustrate at least one embodiment of the present invention and are not intended to limit the scope of the invention.

The present invention is directed to an electronic device, system and method for detecting and tracking a sensed signal in real time. As explained in further detail below with reference to the figures, the present invention is directed to a detector system that tracks the maximum amplitude or peak and/or the minimum amplitude or "min" of a sensed signal such as is used in magnetoresistive sensing systems for tracking a threshold value of a sensor output signal subject to fluctuation or drift. As employed in such systems, the peaks and minimums of a sensed signal are tracked as dynamically adjustable amplitude boundaries from which can be derived a real time mid-signal threshold value of and amplified/conditioned differential signal (i.e. a signal varying between a high and low level).

In one embodiment applicable with an anisotropic magnetoresistive (AMR) sensor, the improved detector of the present invention utilizes a dual comparator design to implement a "look-ahead" function enabling dynamically adjustable peak/min tracking having high resolution during low slew periods and switching to faster tracking during higher slew periods. Given that the function and structure of the peak and min detectors of the present invention share the same inventive principle and only differ regarding signal level and polarity, the terms "peak reference value" and "min reference value" may be referred to generically herein as "amplitude boundary values."

Figure 2:
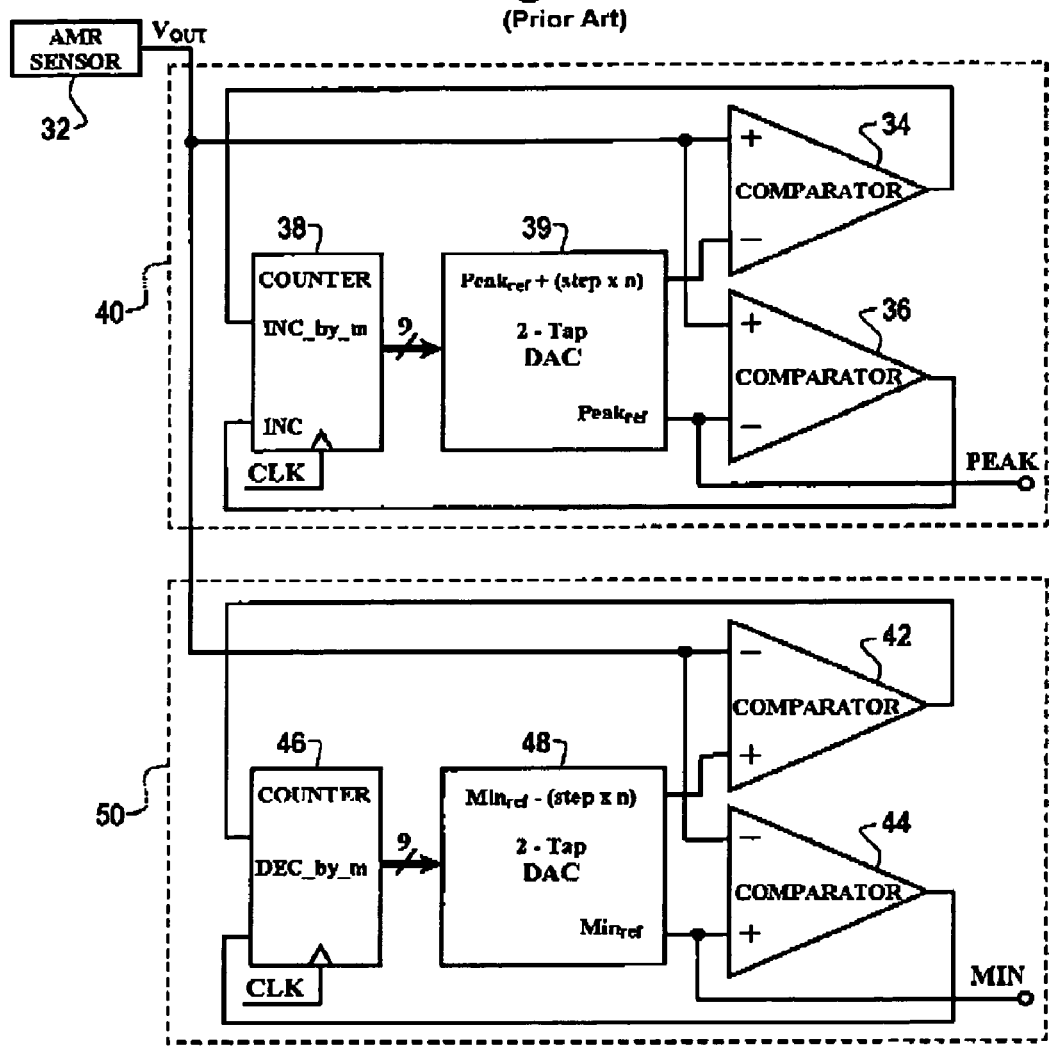
FIG. 2 depicts a signal boundary tracking system as implemented within an anisotropic magnetoresistive sensing system in accordance with a preferred embodiment of the present invention.

With reference now to the figures, wherein like reference numerals refer to like and corresponding parts throughout, and in particular with reference to FIG. 2, there is depicted a signal boundary tracking system as implemented within an anisotropic magnetoresistive sensing system in accordance with a preferred embodiment of the present invention. As shown in FIG. 2, the signal boundary tracking system includes a peak detector 40 and a min detector 50 each receiving a sensed output signal, $V_{out}$, from an AMR sensor 32. Peak detector 40 and min detector 50 detect and track changes in peak and min amplitude values, respectively, of $V_{out}$ such that a real time determination of the sensor signal average or threshold value can be derived therefrom and utilized for ultimate signal detection.

To this end, each detector includes comparator functionality for comparing the real time sensor output, $V_{out}$, with multiple reference values derived from a stored amplitude boundary value (i.e. a peak boundary value for peak detector 40 and a min boundary value for min detector 50) which are stored in counters and converted to corresponding signal levels by digital-to-analog converters (DACs). Responsive to a given comparison exceeding the amplitude boundary value (extending above the peak boundary or below the min boundary), the respective detector adjusts its stored reference value accordingly by incrementing (as in the case of peak detector 40) or decrementing (as in the case of min detector 50) the counter storage device. The DAC means within the detectors then apply the discretely adjusted reference signals to the comparator means for the next comparison.

The structure and operation of the present invention will now be described with reference to peak detector 40. As shown in the depicted embodiment, peak detector 40 is a mixed signal device including a counter 38 that stores a reference peak amplitude value, which in the depicted embodiment is a 9-bit value. The output of counter 38 is delivered to a two-tap DAC 39 that converts the digital value to reference signal levels that are applied to the inputs of a pair of comparators 34 and 36. Specifically, DAC 39 converts the digital amplitude peak value into a first signal level directly corresponding to the digitally stored peak value and a second signal level corresponding to the peak value advanced by a desired "look-ahead" increment. The signal level values and increments incident to the DAC conversion will depend on the DAC design. Assuming a 2V DAC range, 9-bit DAC 39 has an increment resolution of approximately 3.9 mV.

As shown in FIG. 2, comparator 36 receives as inputs the real-time sensed output, $V_{out}$, and the non-incremented DAC output, $Peak_{ref}$, which is the signal level corresponding directly to the value of the peak amplitude stored by counter 38. Responsive to $V_{out}$ exceeding $Peak_{ref}$, comparator 36 delivers an increment signal to a single step increment input of counter 38. Again assuming a 2V DAC range, the resultant value converted from counter 38 to the DAC output, $Peak_{ref}$, will be the previous $Peak_{ref}$ incremented by 3.9 mV. In this manner, the peak value of $V_{out}$ is periodically detected and tracked with relatively high resolution.

As further depicted in FIG. 2, DAC 39 includes a second tap output from which a second reference signal value is applied as the reference input into comparator 34 which compares the second reference signal value with the real-time sensed output, $V_{out}$. In accordance with the present invention, this second reference signal serves a "look-ahead" function and is derived by incrementing the current peak reference value by a given multiple of the DAC resolution step size. In the depicted embodiment, the second reference signal is incremented by the resolution step size "step" multiplied by n, where n is an integer greater than or equal to one.

Responsive to the sensor output exceeding the incremented second reference signal, comparator 39 delivers an increment signal to a second increment input of counter 38, where the second increment input increments the present counter value by a number, m, where m is an integer greater than or equal to n. With the sensor signal exceeding both the incremented and non-incremented reference signals, the second m-bit increment input has priority over the single bit increment input into counter 38. While the look-ahead increment value n may be any number greater than or equal to one, in a preferred embodiment for a 9-bit counter/DAC implementation with an approximate 3.9 mV step size, n is preferable four. In foregoing manner, while comparator 36 performs a fine resolution peak adjustment function, comparator 34 detects higher slew rate periods of the sensor output and adaptively adjusts the present peak value accordingly such that the resultant detected peak value "Peak" is provided at the $Peak_{ref}$ output of DAC 39.

Figure 1A:
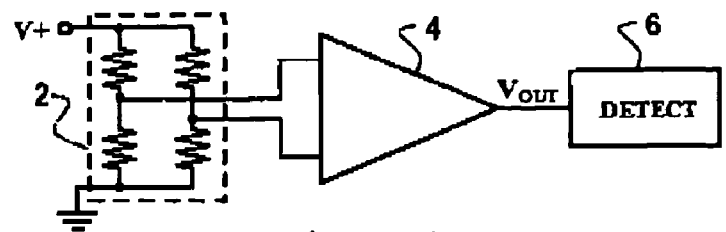
FIG. 1A illustrates a simplified magnetoresistive sensing and detection system.
Figure 1B:
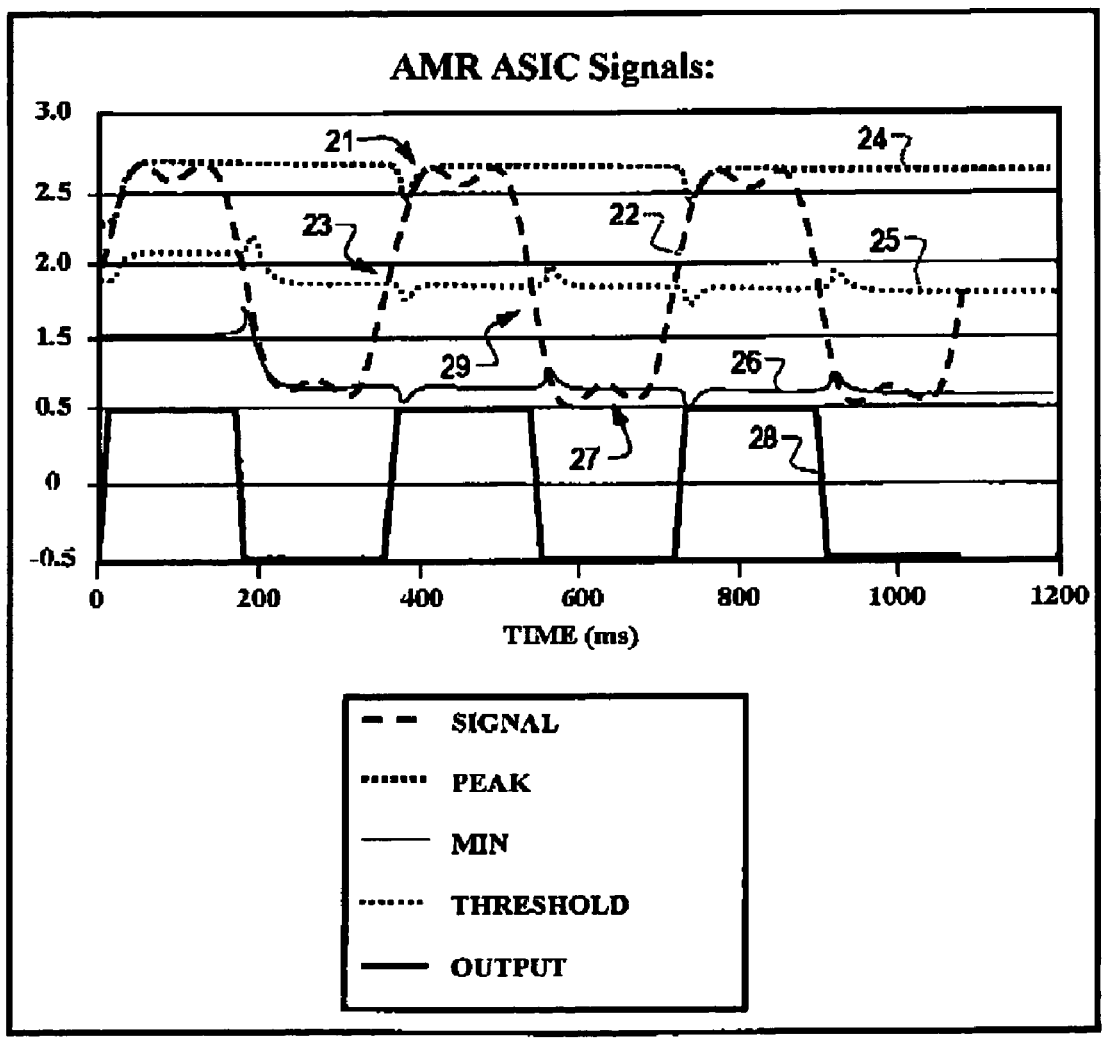
FIG. 1B is a waveform diagram depicting exemplary signals employed a magnetoresistive system for conditioning and detecting a sensed output signal.
Figure 1C:
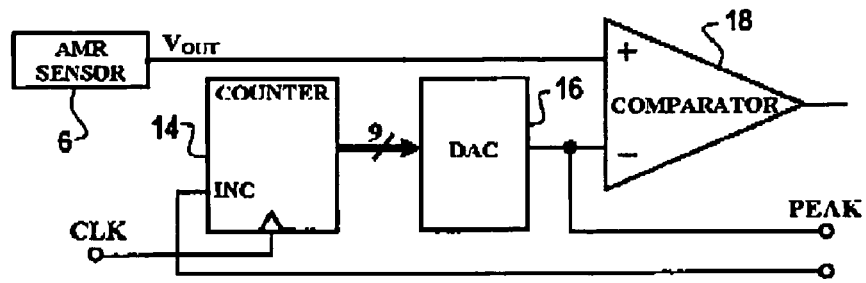
FIG. 1C illustrates a device that may be employed by a sensing system for tracking a peak signal value.

Referring to FIG. 1B, the dual comparator functionality of peak detector 40 operates as follows. During relatively low slew periods 21, comparator 36 increments the peak value in counter 38 with single step resolution for maximum peak point detection, while comparator 23 performs faster tracking of the steeply upwardly sloping sensor output during high slew rate periods 23.

Structurally and operationally analogous to peak detector 40, the constituent components of min detector 50 are designed for performing a dual comparison for detecting and tracking sensor output minimums. Min detector 50 is also a mixed signal device including a counter 46 that stores a reference min amplitude value, which in the depicted embodiment is a 9-bit value. The output of counter 46 is delivered to a two-tap DAC 48 that converts the digital value to reference signal levels that are applied to the inputs of a pair of comparators 42 and 44. DAC 48 converts the digital amplitude min value into a first signal level directly corresponding to the digitally stored min value and a second signal level corresponding to the min value reduced by the desired "look-ahead" decrement. As with peak detector 40, the resolution increment step size of the min tracking will depend on the DAC design in terms of voltage range.

Comparator 44 receives as inputs the sensed output, $V_{out}$, and the non-decremented DAC output, $Min_{ref}$, which is the signal level corresponding directly to the value of the min amplitude stored by counter 46. Responsive to determining that $V_{out}$ is lower in amplitude than $Min_{ref}$, comparator 44 delivers a decrement signal to a single step decrement input of counter 46. Assuming a 2V DAC range, the resultant value converted from counter 46 to the DAC output, $Min_{ref}$, will be the previous $Min_{ref}$ decremented by 3.9 mV. In this manner, the min value of $V_{out}$ is detected and tracked with relatively high resolution during low slew rate periods of $V_{out}$.

DAC 48 includes a second tap output from which a second reference signal value is applied as the reference input into comparator 42. In accordance with the present invention, this second reference signal serves a "look-ahead" function and is derived by decrementing the current min reference value by a given multiple of the DAC resolution step size. In the depicted embodiment, the second reference signal is decremented by the resolution step size "step" multiplied by n, where n is an integer greater than or equal to one. Responsive to the decremented second reference signal extending below the sensor output, comparator 42 delivers a decrement signal to a second decrement input of counter 46, where the second decrement input decrements the present counter value by m bits, where m is greater than or equal to n. In the foregoing manner, while comparator 44 performs a fine resolution min adjustment function, comparator 42 anticipates higher slew rate periods of the sensor output and adaptively decrements the presently stored min value accordingly.

Referring to FIG. 1B, the dual comparator functionality of min detector 50 operates as follows. During relatively low slew min periods 27, comparator 44 decrements the min value in counter 46 with single step resolution for maximum min point detection, while comparator 42 performs faster tracking of the steeply downwardly sloping sensor output during high slew rate periods 29.

Figure 3:
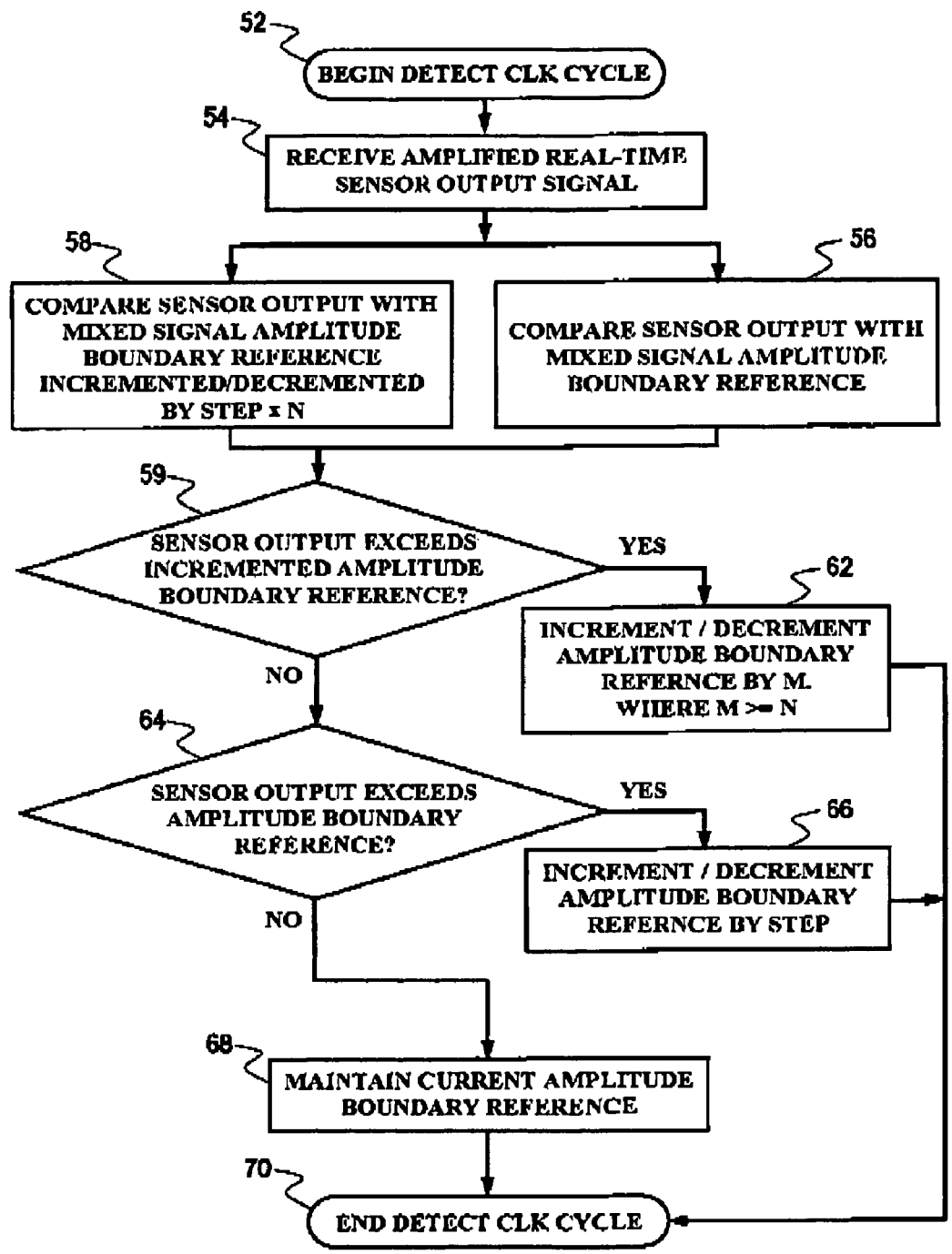
FIG. 3 is a high-level flow diagram illustrating steps performed during signal boundary tracking in accordance with the present invention.

With reference to FIG. 3, there is depicted a high-level flow diagram illustrating steps performed during signal boundary tracking in accordance with the present invention. It will be appreciated that the following operational principles apply equally to peak and/or min amplitude boundary detection and tracking. The process begins on a given counter clock cycle as shown at step 52 with the amplified real-time sensor output signal received by a first comparator means as depicted at step 54. Proceeding to steps 56 and 58, a dual comparison is performed to determine a change in the received sensor output amplitude. Specifically, and as illustrated at step 56, the sensor output is compared with a signal level corresponding to a presently stored amplitude boundary reference value. Simultaneously, with the comparison at step 56, the sensor output is compared with a signal level corresponding to the presently stored amplitude boundary value incremented by the DAC resolution step size multiplied by n as shown at step 58.

As illustrated at steps 59 and 62, if as determined by the comparisons at steps 56 and 58, the sensor output exceeds the incremented amplitude boundary value (i.e. the sensor value is greater than the stored peak incremented by n multiplied by the resolution step size or is less than the stored min decremented by n multiplied by the resolution step size), the stored amplitude boundary reference value is incremented (or decremented in the case of a min detector) by m, where m is greater than or equal to n. The incremented/decremented digital value is maintained to the end of the counter clock cycle as shown at step 70.

If, as determined by the comparisons at steps 56 and 58, the sensor output exceeds the non-incremented amplitude boundary reference but does not exceed the incremented boundary value, the stored amplitude boundary value is incremented by a single step as depicted at steps 59, 64, and 66. Finally, if the sensor output exceeds neither the amplitude boundary reference nor the incremented amplitude boundary reference, the presently stored amplitude boundary reference is maintained to the end of the clock cycle as shown at steps 59, 64, 68, and 70.

In the foregoing manner, the present invention provides a system and method for adaptively tracking single-ended amplitude boundary values for sensor systems, and particularly magnetic sensor systems in which such amplitude boundary values must be accurately tracked to determine a resultant threshold average used for signal detection.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered.

The description as set forth is not intended to be exhaustive or to limit the scope of the invention. Many modifications and variations are possible in light of the above teaching without departing from the scope of the following claims. It is contemplated that the use of the present invention can involve components having different characteristics. It is intended that the scope of the present invention be defined by the claims appended hereto, giving full cognizance to equivalents in all respects.

The invention claimed is:

1. A mixed signal detector for adaptively tracking amplitude boundary values of a sensor signal, said signal detector comprising:
    a digital storage device that stores an amplitude boundary value, said digital storage device comprising a counter having a one-bit increment input for incrementing said counter by one-bit in response to an increment signal and an m-bit increment input for incrementing said counter by m bits in response to an increment signal, wherein m is an integer greater than or equal to one, wherein the digitally stored amplitude boundary value comprises a peak boundary value or a min boundary value;
    a converter device for converting the digitally stored amplitude boundary value into a reference signal level corresponding in amplitude to the digitally stored amplitude boundary value and an offset reference signal level corresponding to the digitally stored amplitude boundary value incrementally offset by n, and
    comparator means for comparing the reference signal level and the offset reference signal level with the sensor signal and adjusting the digitally stored amplitude boundary value in response thereto, wherein said comparator means comprises a first comparator receiving the sensor signal and the reference signal level as inputs and a second comparator receiving the sensor signal and the offset reference signal as inputs, said first comparator having an output coupled to said one-bit increment input for incrementing said counter by one bit in response to said sensor signal exceeding said reference signal level but not exceeding said offset reference signal level and said second comparator having an output coupled to said m-bit increment input for incrementing said counter by m-bits in response to said sensor signal exceeding said offset reference signal level.

2. The mixed signal detector of claim 1, wherein the digitally stored amplitude boundary value is a peak amplitude or a min amplitude.

3. The mixed signal detector of claim 1, wherein said converter device is a two-tap digital-to-analog converter (DAC) comprising:
    an input for receiving the digitally stored amplitude boundary value;
    a first output for outputting the reference signal level to the comparator means; and
    a second output for outputting a incremented signal level to the comparator means.

4. The system of claim 1, wherein n is equal to four.

5. A system for adaptively tracking amplitude boundary levels of a sensor signal, said system comprising:
    at least one input providing at least one real-time sensor signal; and
    a mixed signal detector coupled to said input, said mixed signal detector comprising:
        a first counter for digitally storing an amplitude boundary value;
        a first digital-to-analog converter (DAC) having a specified resolution step size for converting the digitally stored amplitude boundary value into a reference signal level corresponding in amplitude to the amplitude boundary value and an offset reference signal level corresponding in amplitude to the amplitude boundary value incrementally offset by an integer, n, multiplied by the resolution step size; and
        comparator means receiving as inputs the sensor signal from said input and further receiving the reference signal level and the offset reference signal level from said first DAC, said comparator means comparing the sensor signal with the reference signal and the offset reference signal and, responsive to the comparisons, delivering an output adjust signal to said counter means for adjusting the amplitude boundary value; and
        wherein said mixed signal detector also includes a min amplitude detector, said min amplitude detector including:

a second counter for digitally storing a mm amplitude boundary value; and a second DAC comprising a two-tap DAC having a specified resolution step size for converting the digitally stored min amplitude boundary value to a min reference signal level corresponding in amplitude to the min amplitude boundary value and a decremented min reference signal level corresponding in amplitude to the min amplitude boundary value decremented by n multiplied by the resolution step size, wherein n is a number greater than or equal to one.

6. The system of claim 5, wherein said mixed signal detector comprises a peak amplitude detector including said first counter, said first DAC and said comparator means, said first counter being configured for digitally storing a peak amplitude boundary value; and said first DAC comprising a two-tap DAC having a specified resolution step size for converting the digitally stored peak amplitude boundary value to a peak reference signal level corresponding in amplitude to the peak amplitude boundary value and an incremented peak reference level corresponding in amplitude to the peak amplitude boundary value Incremented by n multiplied by the resolution step size, wherein n is an integer equal to or greater than one.

7. The system of claim 6, wherein said comparator means includes a first comparator receiving as inputs the sensor signal from said input, and further receiving the peak reference signal level from said first DAC, said first comparator comparing the sensor signal with the peak reference signal level and, responsive to the sensor signal exceeding the peak reference signal level but not exceeding the incremented peak reference signal level delivering an increment signal to a single step increment input of said counter for incrementing said counter by said single step.

8. The system of claim 7, wherein said comparator means further includes a second comparator receiving as inputs the sensor signal from said input, and further receiving the incremented peak reference signal level from said first DAC, said second comparator comparing the sensor signal with the incremented peak reference signal level and, responsive to the sensor signal exceeding the incremented peak reference signal level, delivering an increment signal to an m-step increment input of said counter for incrementing said counter by m steps, where m is greater than or equal to n.

9. The system of claim 8, wherein n is equal to four.

10. The system of claim 5, wherein said min amplitude detector further includes a first comparator receiving as inputs the sensor signal from said input, and further receiving the min reference signal level from said second DAC, said first comparator comparing the sensor signal with the min reference signal level and, delivering a decrement signal to a single step decrement input of said counter for incrementing said counter in response to the sensor signal being below the min reference signal level but not below the decremented min reference signal level.

11. The system of claim 10, wherein said min amplitude detector further includes a second comparator receiving as inputs the sensor signal from said input, and further receiving the decremented peak reference signal level from said second DAC, said second comparator comparing the sensor signal with the decremented min reference signal level and, responsive to the sensor signal being below the decremented min reference signal level, delivering an decrement signal to an m-step decrement input of said counter, wherein m is greater than or equal to n.

12. A method for adaptively tracking amplitude boundary values of a real time sensor output signal, said method comprising:

storing an amplitude boundary value representing the current amplitude boundary of the sensor output signal within a digital counter;

converting the digitally stored amplitude boundary value into a reference signal level corresponding in amplitude to the amplitude boundary value and an offset reference signal level corresponding in amplitude to the amplitude boundary value offset by n, wherein n is greater than or equal to one;

comparing the reference signal level and offset reference signal with the real time sensor signal;

incrementing or decrementing the digitally stored amplitude boundary value by m steps in response to said sensor output signal respectively exceeding above or extending below said offset reference signal, said m being greater than or equal to n; and incrementing or decrementing the digitally stored amplitude boundary value by a single step in response to said sensor output signal respectively exceeding above or extending below said reference signal level but not said offset reference signal.

13. The method of claim 12, wherein said converting step is performed by a two-tap digital-to-analog converter (DAC) having a specified resolution step size, said converting the digitally stored amplitude boundary value into an offset reference signal level further comprising converting the amplitude boundary value into an offset reference signal level corresponding In amplitude to the amplitude boundary value incrementally offset by an integer, n, multiplied by the resolution step size.

14. The method of claim 13, further comprising delivering the reference signal level from a first output of the two-tap DAC and delivering the offset reference signal level from a second output of the two-tap DAC.

15. The method of claim 13, wherein said stored amplitude boundary value is a peak amplitude boundary value, said converting the digitally stored amplitude boundary value into an offset reference signal level further comprising converting the amplitude boundary value into an offset reference signal level incremented by a multiple of the DAC resolution step size.

16. The method of claim 13, wherein said stored amplitude boundary value is a min amplitude boundary value, said converting the digitally stored amplitude boundary value into an offset reference signal level further comprising converting the amplitude boundary value into an offset reference signal level decremented by a multiple of the DAC resolution step size.

17. The system of claim 12, wherein n is equal to four.

* * * * *